(12) United States Patent
Shooter et al.

(10) Patent No.: US 11,649,309 B2
(45) Date of Patent: May 16, 2023

(54) ACRYLIC DISPERSANTS WITH FUSED AROMATIC IMIDE ANCHOR GROUPS

(71) Applicant: Lubrizol Advanced Materials, Inc., Cleveland, OH (US)

(72) Inventors: Andrew J. Shooter, Wilmslow (GB); Dean Thetford, Norden (GB); Robert A. Jennings, Prestwich (GB); Stuart N. Richards, Frodsham (GB)

(73) Assignee: Lubrizol Advanced Materials, Inc, Cleveland, OH (US)

( * ) Notice: Subject to any disclaimer, the term of this patent is extended or adjusted under 35 U.S.C. 154(b) by 372 days.

(21) Appl. No.: 16/912,820

(22) Filed: Jun. 26, 2020

(65) Prior Publication Data

US 2020/0325264 A1 Oct. 15, 2020

Related U.S. Application Data

(63) Continuation of application No. 15/032,478, filed as application No. PCT/US2014/062875 on Oct. 29, 2014, now Pat. No. 10,745,506.

(60) Provisional application No. 61/899,455, filed on Nov. 4, 2013.

(51) Int. Cl.

| | | |
|---|---|---|
| *C08F 267/00* | (2006.01) | |
| *C08F 267/10* | (2006.01) | |
| *C08F 290/06* | (2006.01) | |
| *C08F 220/18* | (2006.01) | |
| *C09D 11/107* | (2014.01) | |
| *C08F 283/01* | (2006.01) | |
| *C08F 283/06* | (2006.01) | |
| *C08F 267/06* | (2006.01) | |
| *C09D 133/04* | (2006.01) | |

(52) U.S. Cl.
CPC ...... *C08F 220/1804* (2020.02); *C08F 267/06* (2013.01); *C08F 267/10* (2013.01); *C08F 283/01* (2013.01); *C08F 283/06* (2013.01); *C08F 290/061* (2013.01); *C08F 290/062* (2013.01); *C08F 290/067* (2013.01); *C09D 11/107* (2013.01); *C09D 133/04* (2013.01)

(58) Field of Classification Search
CPC .... C08F 267/06; C08F 267/10; C08F 220/18; C08F 283/06; C08F 290/061; C08F 290/067; C08F 290/062
See application file for complete search history.

(56) References Cited

U.S. PATENT DOCUMENTS

| | | |
|---|---|---|
| 5,852,123 A | 12/1998 | Huybrechts et al. |
| 6,037,414 A | 3/2000 | Simms et al. |
| 2010/0240825 A1 | 9/2010 | Shimohara et al. |

FOREIGN PATENT DOCUMENTS

JP 2013053200 A 3/2013

OTHER PUBLICATIONS

Simms, J.A., "A new graft copolymer pigment dispersant synthesis", published in Progress in Organic Coatings 35, No. 1-4, (1999) 205-214 discloses grafting phthalimide onto an epoxide functional acrylate, XP002733131.
Wang, C-S, "Properties of Conjugated Ladder Polymers", Trends in Polymer Science, Elsevier Science Publishers B.V. Amsterdam, NL, vol. 1, No. 7, Jul. 1, 1993, pp. 199-205, XP000418351.

*Primary Examiner* — Michael L Leonard
(74) *Attorney, Agent, or Firm* — Samuel B. Laferty; Vincent Cortese; Michael Miller

(57) ABSTRACT

Polymeric dispersants are disclosed that include an acrylic backbone at least one pendantly attached imide group, wherein the carbonyl of the imide are chemically bonded to a fused aromatic ring. The aromatic ring can be substituted with various electron withdrawing or releasing groups. Desirably dispersant also includes solvent-solubilising chains of polyether, polyester, polyacrylate, and or polyolefin.

17 Claims, No Drawings

ACRYLIC DISPERSANTS WITH FUSED AROMATIC IMIDE ANCHOR GROUPS

This application is a continuation application based on U.S. patent application Ser. No. 15/032,478, filed on Apr. 27, 2016, which claims priority from PCT Application Serial No. PCT/US2014/062875, filed on Oct. 29, 2014, which claims the benefit of U.S. Provisional Application No. 61/899,455, filed on Nov. 4, 2013.

FIELD OF INVENTION

The present invention relates to acrylic polymer dispersants having a least one imide anchoring group wherein the carbonyl groups of the imide are chemically bonded to a fused aromatic ring such as naphthalene.

BACKGROUND OF THE INVENTION

The disclosed technology relates to polymeric acrylic dispersants.

The disclosed technology, therefore, solves the problem of improving dispersant performance with a pendant aromatic imide anchoring segment.

SUMMARY OF THE INVENTION

The disclosed technology provides a polymeric dispersant that resembles acrylic type polymers because the backbone of the polymer is derived from polymerizing acrylic type monomers comprising monomers selected from acrylic acid, esters of acrylic acid, amides of acrylic acid, styrene, acrylic acid esters carrying other functional groups containing oxygen or nitrogen, styrene carrying other functional groups containing oxygen or nitrogen, acrylic acid or styrene based monomers having a chemically attached imide group where the carbonyls of the imide are directly chemically bonded to the carbon atoms of a fused aromatic ring, and optionally acrylic acid or styrene based macromonomers functionalized with solvent solubilizing chains of polyethers, polyesters, polyolefins, and/or polyacrylates.

The polymeric dispersants will be characterized as having a) aromatic imide anchoring groups that interact favorably with particulate matter such as pigments or fillers and b) solvent-solubilizing groups that interact favorably with the medium in which the particulate is dispersed. The dispersant will colloidally stabilize the particulate as a dispersed phase in the medium. The medium can be water, polar organic medium, or non-polar organic medium. The medium will dictate the solvent-solubilizing chains used in the dispersant as some solvent-solubilizing chains (e.g. polyethers) interact favorably with very polar medium such as water, other solvent-solubilizing chains (polyacrylates and polyolefins) interact favorably with non-polar medium. The medium can also be polymeric or a thermoplastic. Preferred final compositions are inks, millbases, coatings, pigmented and/or filled plastics.

The dispersants can be block copolymers having at least two blocks. The dispersants can have a block structure where the solvent-solubilizing chains are terminal and can have block structure where some of the solvent-solubilizing chains are essentially linear chains between two anchoring polymer backbone segments. A preferred version of the dispersant uses solvent solubilizing chains derived from ethylenically unsaturated macromonomers having attached solvent-solubilizing chains. When said macromers are co-polymerized with the various acrylic and styrene type monomers the solvent-solubilizing chains are attached at one point to the dispersant backbone but the other end of the solvent-solubilizing chain has freedom to extend into the continuous medium. Dispersants with laterally attached pendant solubilizing chains are often referred to as comb polymers.

According to the present invention there is provided a composition comprising a particulate solid, an organic or aqueous medium and a compound of Formula (1) where G is a $CH_3$ or H group, or mixtures thereof and A,B,C and D are defined later. A is a moiety comprising a fused aromatic imide group. B and C are the ester portion of acrylate or styrene type monomers; D is a polyether, polyester, polyacrylate, and/or polyolefin chain that is linked to the backbone of formula 1 by various connecting groups. The E portion of formula 1 is known as the anchoring segment of the dispersant and the F portion of formula 1 is known as the solubilizing portion.

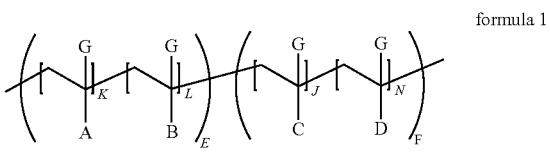

formula 1

In another embodiment these dispersants are made by living polymerizations of the ethylenically unsaturated monomers and optional macromonomers. Living free radical polymerizations provide the opportunity to add specific monomers and macromonomers in specific orders during dispersant polymerization (making well controlled block and comb type polymeric dispersants).

DETAILED DESCRIPTION OF THE INVENTION

Various preferred features and embodiments will be described below by way of non-limiting illustration.

The amount of each chemical component described is presented exclusive of any solvent or diluent oil, which may be customarily present in the commercial material, that is, on an active chemical basis, unless otherwise indicated. However, unless otherwise indicated, each chemical or composition referred to herein should be interpreted as being a commercial grade material which may contain the isomers, by-products, derivatives, and other such materials which are normally understood to be present in the commercial grade. The use of (meth) in a monomer or repeat unit indicates an optional methyl group.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

One objective of the present invention is to provide compounds that are capable of improving the colour strength or other tinctorial properties, increasing a particulate solid load, and/or forming improved dispersions, having improved brightness of the final composition while also producing a composition with reduced viscosity good dispersion stability, reduced particle size and reduced particle size distribution (typically reduced to an average of 150 nm or less, for example in the range of 70-135 nm), reduced haze, improved gloss, and increased jetness (especially when the composition is black). The composition of the present invention may also be stable under ambient storage, and high temperature storage conditions, providing reduced discolouration or yellowing of the final coating.

The dispersants of this disclosure use acrylic and/or styrene based monomers with pendant (laterally attached) imides where the carbonyl groups of the imide are chemically bonded to fused aromatic rings (such as naphthenic rings) as anchor groups for particulate materials such as pigments and fillers in a continuous media such a polar or non-polar solvent. The resulting pendant groups from the backbone are shown in the formulas 2-9. These polar and non-polar solvents may be plastic materials or elastomeric materials. The dispersants typically have an anchoring portion, which generally anchors to the particulate, and a solubilizing portion, which generally favorably interacts with the media, and provides some form of colloidal stabilization against aggregation and/or agglomeration of the particulate when functioning as a dispersant.

The imides of this invention which have carbonyl groups chemically bonded to fused aromatic rings can function as pigment anchoring functionality. Formulae 2-9 provide a wide range of fused aromatic imide moieties that can be incorporated into an acrylic polymer. Preferred fused aromatic rings include naphthalene, anthracene, phenanthrene and the preferred number of fused rings is generally from 2 to 6 and preferably 2 or 3 per imide group. It is desirable to have from 1 to 50 imide groups attached to fused aromatic rings per polymeric dispersant and more desirably from about 2 to about 25. It is desirable that the weight percent of the imide and fused aromatic ring is from about 1 to about 35 wt. % of the weight of the dispersant, and more desirably from about 1 to about 15 or 25 wt. %. For this wt. % calculation the imide includes the imide ring, the fused aromatic rings and their $R_1$ substituents; but neither includes $R_2$ nor any groups between $R_2$ and the dispersant polymer backbone.

A is a moiety comprising a fused aromatic imide and a connecting group comprising a hydrocarbylene group of 1 or 2 to 30 carbon atoms and optionally comprising up to 3, 4, or 5 oxygen atoms and up to 3, 4, or 5 nitrogen atoms in ether, ester, and amide type linkages, represented by but not limited to formulae 2-10 below where the portion of Formula 1 having the subscript where ⌇ indicates the carbon backbone of formula 1 and also the carbon-carbon bond to the carbon backbone of formula 1. The ⌇ is not considered to be part of formulas 2-9, 11-18, and 20-27 but rather indicates where the formulas connect to the backbone of formula 1.

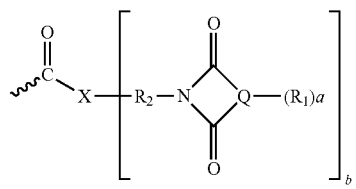

Formula 2

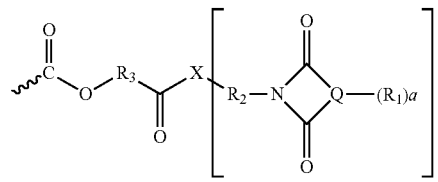

Formula 3

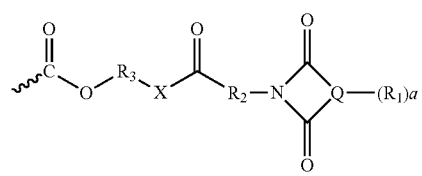

Formula 4

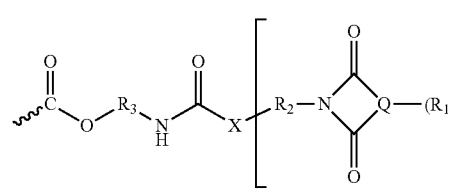

Formula 5

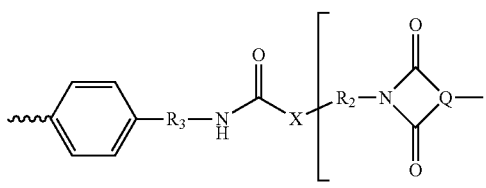

Formula 6

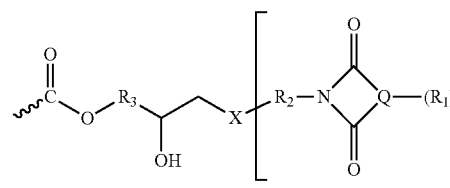

Formula 7

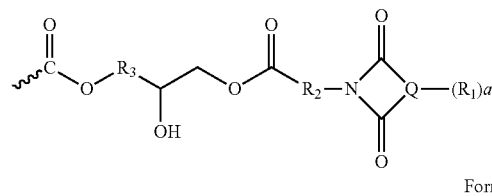

Formula 8

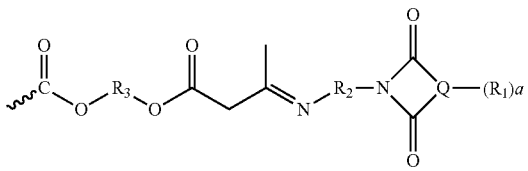

Formula 9

$R_1$ may be a substituent on Q ring in any position available for bonding to a substituent group and $R_1$ may be independently represented by one or more of H, or an electron withdrawing group (such as —$NO_2$, —$SO_2NR'_2$, —C(O)R', —$SO_3M$, halo e.g., —Cl or —Br, —$NH_2$, or —OR'), or an electron releasing group (such as an alkyl group e.g., —$CH_3$), (typically when $R_1$ may be other than H, the number of non-H groups defined by a may be 0 to 2, 0 to 1, 0, or 1). For example, $R_1$ may be —H, —$CH_3$, —Cl, or —Br, —NO$_2$, —SO$_3$M, or —CN (typically when a may be non-zero R$_1$ may be —Cl, —Br, —SO$_3$M or —NO$_2$); desirably the substituent(s) R$_1$ on the aromatic ring (Q) portion of the aromatic imide do not form a second heterocyclic ring and in particular neither form a second imide ring nor anhydride ring of a dicarboxylic acid;

M may be H, a metal cation, NR'$_4^+$, or mixtures thereof;

R' may be —H, an optionally-substituted alkyl typically containing 1 to 20, or 1 to 10 carbon atoms, and the substituent may be hydroxyl or halo (typically Cl or Br) or mixtures thereof;

R$_2$ may be a C$_1$ to C$_{20}$, or C$_1$ to C$_{12}$, or C$_1$ to C$_6$ hydrocarbylene group or a C$_1$ to C$_{20}$, or C$_1$ to C$_{12}$, or C$_1$ to C$_6$ hydrocarbonylene group (when R$_2$ contains more than 2 carbon atoms, the hydrocarbylene group or hydrocarbonylene group may be linear or branched) or mixtures thereof; hydrocarbonylene group will be defined as a hydrocarbylene group that includes at least one carbonyl group. R$_2$ may include oxygen and/or nitrogen atoms wherein there are at least two carbon atoms per every oxygen or nitrogen of R$_2$, these would include ether, ester and amide type linkages in R$_2$.

R$_3$ is independently an alkylene group that may be linear or branched having a carbon number of 1-25, X can be O, S, C(=O), NR', or N preferably O, NR', N b can be 1 or 2, when b=1, X can be O, S, C(=O), or —NR', when b=2 X can be N The imide represented in Formula (10) may be prepared by the reaction of a fused aromatic anhydride with an amino alcohol, a di- or polyamine, an aminocarboxylic acid or combinations thereof.

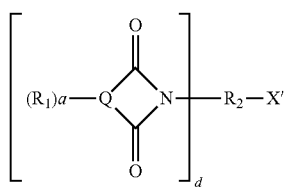

Formula (10)

Wherein R$_1$, Q, a, d, and R$_2$, are as earlier defined, X' is NH$_2$, NH, COOH, or OH.

Examples of typical aminoalcohols used to prepare imides of Formula (10), wherein R$_2$ is a C$_1$ to C$_{20}$ hydrocarbylene group and X' is OH, may be ethanolamine, 3-amino-1-propanol, 4-aminobutanol, 2-aminobutanol, 2-amino-2-methyl-1-propanol, 5-amino-1-pentanol, 5-amino-2-pentanol, 2-amino-3-methyl-1-butanol, 6-amino-1-hexanol, 2-amino-1-hexanol, serinol, 4-amino cyclohexanol, 2-(2-aminoethoxy)ethanol, 1,3-diamino-2-propanol or mixtures thereof.

Examples of typical di- or polyamines used to prepare imides of Formula (10), wherein R$_2$ is a C$_1$ to C$_{20}$ hydrocarbylene group and X' is NH$_2$ or NH, include 1-methyl-1,3-propanediamine, n-methylene ethylene diamine, 1,2-diaminoethane, propane-1,3-di amine, butane-1,4-diamine, pentane-1,5-diamine, hexane-1,6-diamine, dodecane-1,12-diamine, di ethylenetriamine or mixtures thereof. They may be prepared by the reaction of an anhydride with a diamine such as ethylene diamine as described in Dalton Transactions, 2003, 4537-4545.

Examples of typical aminocarboxylic acid (or aminoacid) used to prepare imides of Formula (10), wherein R$_2$ is a C$_1$ to C$_{20}$ hydrocarbonylene group and X' is OH, may be an amino-C$_{2-20}$-alk(en)ylene carboxylic acid and may or may not contain more than one carboxylic acid group and may or may not contain more than one amino group. The aminocarboxylic acid may or may not contain other groups containing heteroatoms such as hydroxyl groups. The alk(en)ylene group may be linear or branched. The alk(en)ylene group of the amino carboxylic acid contains not greater than 12 carbon atoms. Specific examples include 11-amino undecanoic acid, 12-amino dodecanoic acid, 6-amino caproic acid, 4-aminobutyric acid, aspartic acid, glutamic acid, lysine, asparagine, glutamine, threonine, serine, cysteine, β-alanine, glycine, and sarcosine. Mixtures of amino carboxylic acids may be used.

The technical feature defined within Q of 4n+2 π-electrons is well known to a skilled person as Hückel's rule. Typically, n may be equal to 2 (i.e., the number of π-electrons is 10) or 3 (i.e., the number of π-electrons is 14).

Typically, Q is based on 1,8-naphthalene anhydride, or 1,2-naphthalene anhydride, or mixtures thereof. In one embodiment, Q is based upon 1,8-naphthalene anhydride, or 1,2-naphthalene anhydride, or 2,3-naphthalic anhydride.

Q may be based on a naphthalene imide such as 4-nitro-1,8-naphthalic imide or 3-nitro-1,8-naphthalic imide (when one R$^1$=NO$_2$), 4-chloro-1,8-naphthalic imide (when one R$^1$=Cl) group, 4-sulpho-1,8-naphthalic imide or 3-sulpho-1,8-naphthalic imide (when one R$^1$=SO$_3$H), or mixtures thereof.

In one embodiment, when R$^1$ is other than H, the number of non-H groups defined by "a" may be 1 or 2. When R$^1$ is other than H, the group defined by R$^1$ may be electron-withdrawing (such as —NO$_2$ group, —SO$_3$M group or a halo group, typically —Cl, or —Br), typically electron-withdrawing. When R$^1$ is electron-withdrawing, the R$^1$ may be either meta-substituted or para-substituted relative to the imide group or mixtures thereof. In one embodiment, the R$^1$ may be meta-substituted relative to the imide group.

In one embodiment, when R$^1$ is other than H, the number of non-H groups defined by a may be 0.

R$^1$ may typically be hydrogen.

R' may be an alkyl or optionally-substituted alkyl having an alkyl group that is linear or branched.

The alkyl groups defined by R' include methyl, ethyl, propyl, butyl, pentyl, hexyl, heptyl, 2-ethylhexyl, nonyl, decyl, undecyl, dodecyl, tridecyl, tetradecyl, pentadecyl, hexadecyl, heptadecyl, octadecyl, nonadecyl, eicosyl, or mixtures thereof. In one embodiment, R' may be derived from an alkanol.

In one embodiment, the imide represented by Formula (10) may be obtained/obtainable by a process comprising: reacting (i) an amino acid or (ii) an aminoalcohol, or (iii) a diamine or polyamine, with an aromatic di-acid or anhydride or other acid-forming derivative (such as di-ester, di-amide, di-acid dichloride) to form an acid-functionalised aromatic imide or a hydroxyl-functionalised aromatic imide, or an amino-functionalised aromatic imide respectively. The reaction to form the imide may be carried out at a sufficiently high temperature known to the skilled person to favour imide formation e.g., at least 100° C., or 120° C. or 150° C. to 200° C.

The acrylic dispersants can be of the block type or comb type of polymers or blocks of anchoring with intermittent branches of solvent-solubilizing chains. The acrylic dispersants can be limited to a couple of blocks or they can be alternating copolymers with 3 or more blocks. The solubilizing chains that interact with the continuous media can be laterally attached to an acrylic type backbone or they can be terminally attached or attached as blocks in the copolymer dispersant.

According to the present invention there is provided a composition comprising a particulate solid, an organic or aqueous medium and a compound of Formula (1)

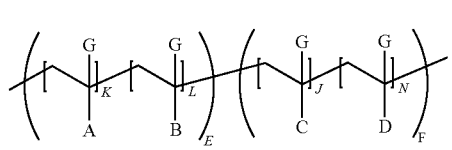

formula 1 where G is a $CH_3$ or H group, or mixtures thereof
A is a moiety comprising a fused aromatic imide group and is pendant from a repeat unit from polymerizing $CH_2$=C(G)-,
B is a moiety derived from polymerizing ethylenically unsaturated monomers of which acrylic and/or styrene type monomers are at least 80, more desirably 85, 90, or 95 mole percent,
C is a moiety similar to B derived from polymerizing ethylenically unsaturated monomers of which acrylic and/or styrene type monomers are at least 80, more desirably 85, 90, or 95 mole percent, acrylic type monomers will be defined to be acrylic acids and esters of acrylic acid where the alkoxy group of the ester has from 1 to 25 carbon atoms and optionally include an epoxide group and/or hydroxyl group;
D is a moiety derived from a macromonomer comprising polyether, polyester, polyacrylate, polyurethane, polyolefin and mixtures thereof,
the portion of formula 1 having the subscript E is the anchoring segment of the copolymer containing the imide and is typically present from 10-60 wt. % especially preferred is 30-50 wt. % of the acrylic dispersant,
the portion of formula 1 having the subscript F is the stabilizing segment of the copolymer and is typically present from 40-90 wt. % especially preferred is 50-70 wt. %;
A and B may be randomly or block copolymerized in the segment of formula 1 with subscript E;
C and D may be randomly or block copolymerized in the segment of formula 1 with the subscript F;
In a block or comb copolymer moiety B is not identical to C and L maybe equal to J;
In a gradient copolymer moiety B can be identical to C but L is not equal to J;
The copolymer may be segmented such that the imide functionality A is distributed at the ends (E) of the polymer chain (e.g. E-F-E block copolymer) or in the middle of the polymer chain (e.g. F-E-F block copolymer);
The sum of total K+L+J+N in the dispersant are such that the polymer has a number average molecular weight greater than 1000, preferably greater than 2000, especially greater than 3000 g/mole.
K, L, J, N, E, and F are non-negative integers and the sum of K+L+J+N appropriately multiplied by E or F are such that the number average molecular weight is less than 100000, preferably less than 60000, especially less than 40000. Sometimes one or more of K, L, J, N, E, and F are zero but they are never all zero. Desirably the dispersant number average molecular weight is from about 1000 to about 100,000 and preferably from about 2,000 to about 60,000 g/mole.

Embodiment 1

Block Copolymer

A block copolymer would comprise of a fused aromatic imide monomer as part of the segment of formula 1 having the subscript E and one or more acrylic monomers
E=1 and F=1

K is not equal to 0
L is optionally equal to 0
J is not equal to 0
N is equal to 0

Embodiment 2

Block Copolymer with Macromonomer Providing Pendant Solubilizing Chain

A block copolymer comprises of a fused aromatic imide monomer and at least one macromonomer. The macromonomer may be at least one ethylenically unsaturated monomer having a polymer chain from molecular weight 300-10,000 comprising polyether, polyester, polyacrylate, or polyolefin.
E=1 and F=1

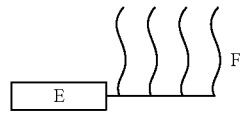

K is not equal to 0
L is optionally equal to 0
J is optionally equal to 0
N is not equal to 0

Embodiment 3

Random Copolymer

E>1 and F>1, E and F are randomly distributed throughout the polymer chain

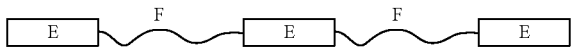

K is not equal to 0
L is optionally equal to 0
J is not equal to 0
N is equal to 0

Embodiment 4

Random Copolymer with Macromonomer

A random copolymer with macromonomer would comprise of a fused aromatic imide monomer and one or more macromonomers. E>1 and F>1, E and F are randomly distributed throughout the polymer chain

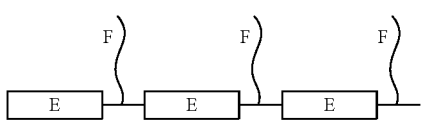

K is not equal to 0
L is optionally equal to 0
J is optionally equal to 0
J is optionally equal to 0
N is not equal to 0

The A moieties in the structure carry the fused aromatic imide structures as previously described with a linking group between the polymer backbone and the fused aromatic imide structure. The repeat unit in the backbone from which the A group is pendant is generally of the acrylic type or styrene type but can be a substituted acrylic or substituted styrene. The connecting groups between the polymer backbone and the nitrogen of the fused aromatic imide structure can have from 1 to 30 carbon atoms, up to 3, 4, or 5 oxygen atoms, and up to 3, 4, or 5 nitrogen atoms. Generally the connecting groups between the polymer backbone and the nitrogen of the fused aromatic imides can include esters, amides, ethers, and other linkages shown in formula 2-9.

B and C are moieties derived from polymerizing ethylenically unsaturated monomers where B and C comprises an alkyl or aromatic group as detailed in formula's 11-13. C is preferably derived from formula 11 as this forms the steric stabilisation segment F but optionally can be derived from formula 12 and/or 13. B is preferably derived from formula 12 or 13 as this forms the anchoring segment E but B can optionally be derived from formula 11.

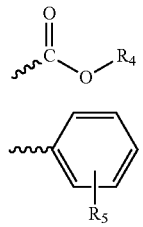

formula 11

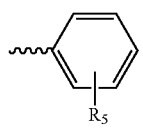

formula 12

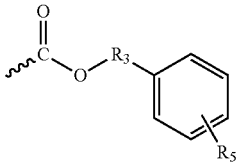

formula 13

$R_4$ is a linear, cyclo or branched alkyl group having carbon number of 1-25,
$R_3$ is as previously defined,
$R_5$ is H, —$CH_3$ or linear or branched alkyl groups having carbon number of 1-25 (typically linear), $R_5$ may contain ether groups.

The monomers polymerized to form the dispersant polymer backbone with pendant B and C groups includes various alkyl (meth)acrylates, (meth)acrylic acid, and the various styrene and substituted styrene monomers. Typical alkyl methacrylates and alkyl acrylates that can be used as a copolymerizable ethylenically unsaturated monomer include methyl (meth)acrylate, ethyl (meth)acrylate, propyl (meth)acrylate, isopropyl (meth)acrylate, butyl (meth)acrylate, isobutyl (meth)acrylate, hexyl (meth)acrylate, 2-ethylhexyl (meth)acrylate, nonyl (meth)acrylate, lauryl (meth)acrylate, stearyl (meth)acrylate, cyclohexyl (meth)acrylate, isodecyl (meth)acrylate, isobornyl (meth)acrylate. Typical aromatic monomers are benzyl (meth)acrylate, styrene, 3-methyl styrene, 4-methyl styrene, 4-tert-butyl styrene, 4-tert-butoxy styrene, B or C (preferably B) may be derived from polymerizing various functional acrylate or styrene monomers and would form the pendant structures from the polymer backbone as detailed in formula 14-18. The polymer backbone is shown with the ∽ which indicates the carbon backbone of formula 1 and also the carbon-carbon bond to the carbon backbone of formula 1 for each pendant group B or C as represented in formula 14-18.

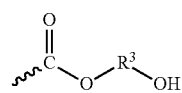

formula 14

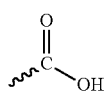

formula 15

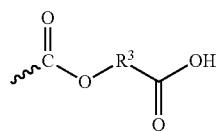

formula 16 formula 17

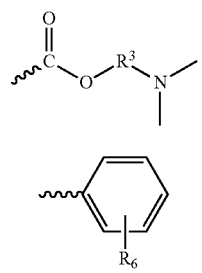

formula 18

$R_3$ as previously defined $R_6$ in the above formula can be —O—C(=O)—$CH_3$, COOH, Br, Cl, F, $NO_2$, Examples of ethylenically unsaturated monomers that form functional groups as B or C include 2-hydroxyethyl (meth)acrylate, 2-hydroxypropyl (meth)acrylate, 2-hydroxybutyl(meth) acrylate, (meth)acrylic acid, beta-carboxyethyl (meth)acrylate, dimethylaminoethyl (meth)acrylate, diethylaminoethyl (meth)acrylate, 3-vinylbenzoic acid, 4-vinylbenzoic acid, 4-acetoxy styrene, 4-vinylbenzyl chloride, 2-bromostyrene, 3-bromostyrene, 4-bromostyrene, 2-chlorostyrene, 3-chlorostyrene, 4-chlorostyrene, 4-chloro-alpha-methylstyrene, 2,6-dichlorostyrene, 2-fluorostyrene, 3-fluorostyrene, 4-fluorostyrene 2,6-difluorostyrene, 3-nitrostyrene.

D is a moiety which contains at least one solvent-solubilizing polymer chain which can be polyolefin, poly(acrylate), polyester or poly(ether). The number average molecular weight may also be in the range of 300 to 5000, or 500 to 3000, or 1000 to 2500 g/mole.

In one embodiment D may comprise an acrylic polymer represented by Formula 19 where ⌇ indicates the carbon-carbon bond from the carbon backbone of formula 1 to the polymer represented by formula 19.

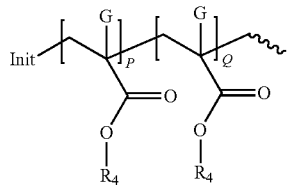

formula 19

Q is an integer from 1 to 200; P is an integer from 1 to 200; G and $R_4$ are as previously defined; Init is an initiator fragment.

Preferably the poly(meth)acrylate may be prepared by Cobalt mediated Catalytic Chain Transfer Polymerization (CCTP) as described in Macromol. Chem Phys 2003, 204, 1406-1418. An example is a macromonomer prepared by Catalytic Chain Transfer Radical polymerization using Cobalt catalyst as described in Example 1 U.S. Pat. No. 6,521,715.

In one embodiment, Moiety D comprises of a polymer chain derived at least one of the following Formulae (20)-(27):

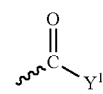

formula (20)

formula (21)

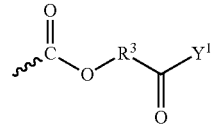

formula (22)

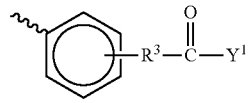

formula (23)

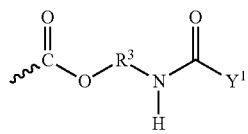

formula (24)

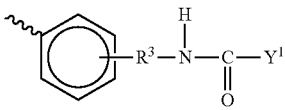

formula (25)

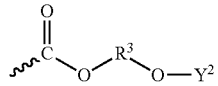

formula (26)

formula (27)

In one embodiment $Y_1$ is represented by a solvent-solubilizing polymers shown in more detail in the table 1.0, where solvent-solubilizing is meant to include water-solubilizing for polymers such ethylene-oxide containing polymers In one embodiment $Y_2$ is represented by a solvent-solubilizing polymer as shown in more detail in table 2.0 below, $R_3$ is as previously defined, $R_7$ represents an alkylene group typically having 1 to 20 carbon atoms and the alkylene group may be linear or branched (typically linear);

P is an integer from 1 to 200; and

Q is an integer from 1 to 200.

TABLE 1.0

Examples of $Y_1$

| Polymer chain | Generic Structure for $Y_1$ (For homo polymers P may be equal to 0) |
|---|---|
| Derived from polymerizing commercially ethylenically unsaturated monomers available as Bisomer® polyethylenelycol(meth)-acrylates: PEM6 LD, PEA6, MPEG350MA, MPEG550MA, S10W, S20W and Bisomer® Polypropylene glycol (meth)acrylates PPA6 and PPM55. | $-[O-R_3]_P-[O-R_7]_Q-O-R_5$ |
| Polyester is obtained/obtainable from a lactone or hydroxy carboxylic acid, typically containing 1 to 26 carbon atoms. | $-[O-R_3-\overset{O}{\underset{\|}{C}}]_P-[O-R_7-\overset{O}{\underset{\|}{C}}]_Q-O-R_5$ |

TABLE 1.0-continued

Examples of $Y_1$

| Polymer chain | Generic Structure for $Y_1$ (For homo polymers P may be equal to 0) |
|---|---|
| Polyether-co-polyester | 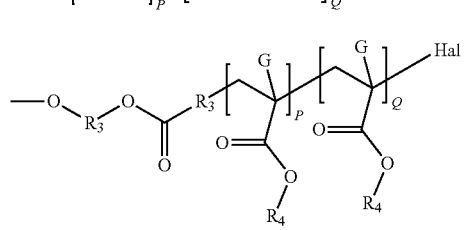 |
| Poly(acrylate) synthesized by transition metal mediated living polymerization, for example ATRP of methyl acrylate as described in Prog. Polym. Sci. 26 (2001) 337-377 using 2-hydroxyethyl 2-bromoisobutyrate as an initiator. Hal = bromine or chlorine | 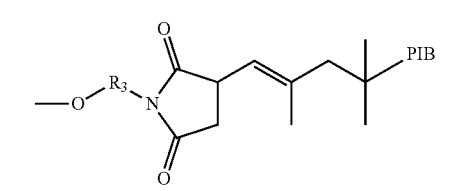 |
| Polyolefin-Polyisobutylene synthesized by reacting polyisobutenyl succinic anhydride (PIBSA) with a hydroxyl amine | 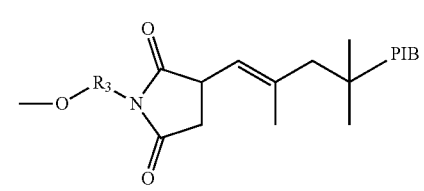 |

TABLE 2.0

Examples of $Y_2$

| Polymer chain | Generic Structure for $Y_2$ (For homo polymers P may be equal to 0) |
|---|---|
| Polyether obtained or obtainable from of ethylene oxide, propylene oxide, butylene oxide or styrene oxide or combination thereof. | 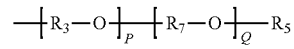 |
| Polyester is obtained/obtainable from a lactone or hydroxy carboxylic acid, typically containing 1 to 26 carbon atoms. | 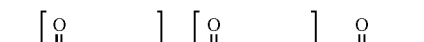 |
| Polyolefin-Polyisobutylene prepared by reacting polyisobutenyl succinic anhydride (PIBSA) with a carboxyl amine | 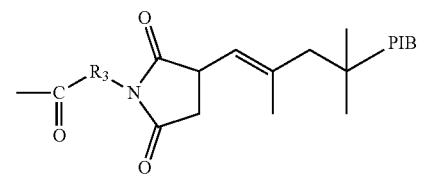 |

When $Y_1$ or $Y_2$ is a polyether the chain may be derived from the polymersation of ethylene oxide, propylene oxide, butylene oxide or styrene oxide and mixtures thereof in the presence of a hydroxyl functional (meth)acrylate and catalyst. Preferred monomers are hydroxyethyl acrylate or hydroxyethyl methacrylate.

When $Y_1$ or $Y_2$ is a polyester examples of suitable lactones include β-propriolactone and optionally $C_{1-6}$-alkyl substituted δ-valerolactone and ε-caprolactone such as β-methyl-δ-valerolactone, δ-valerolactone, ε-caprolactone, 2-methyl-ε-caprolactone, 3-methyl-ε-caprolactone, 4-methyl-ε-caprolactone, 5-tert-butyl-ε-caprolactone, 7-methyl-ε-caprolactone, 4,4,6-ε-caprolactone trimethyl-ε-caprolactone 4,6,6-trimethyl-ε-caprolactone, or mixtures thereof. In one embodiment, B is a moiety that contains at least one polyester chain derivable from δ-valerolactone and ε-caprolactone. The hydroxy carboxylic acid may be saturated or unsaturated, linear or branched. Examples of suitable hydroxy carboxylic acids are glycolic acid, lactic acid, 5 hydroxy valeric acid, 6-hydroxy caproic acid, ricinoleic acid, 12-hydroxy stearic acid, 12-hydroxydodecanoic acid, 5-hydroxydodecanoic acid, 5-hydroxydecanoic acid 4 hydroxydecanoic acid, or mixtures thereof.

When D is derived from a polyacrylate, $Y_1$ or $Y_2$ is a poly(acrylate) alkyl acrylates or alkyl methacrylates are preferred for example methyl (meth)acrylate, ethyl (meth) acrylate, propyl (meth)acrylate, isopropyl (meth)acrylate, butyl (meth)acrylate, isobutyl (meth)acrylate, hexyl (meth)

acrylate, 2-ethylhexyl (meth)acrylate, nonyl (meth)acrylate, lauryl (meth)acrylate, stearyl (meth)acrylate, cyclohexyl (meth)acrylate, isodecyl (meth)acrylate.

The polymer may also prepared by any known polymerization technique that involves a functional initiator, terminator or transfer agent. A preferred technique is the free radical polymerisation of alkyl(meth)acrylates in the presence of a functional chain transfer agent followed by a reaction with a vinyl isocyanate. The polymerisation of alkyl(meth)acrylates in the presence of mercaptoethanol is preferred followed by reaction with either isopropenyl-dimethylbenzyl isocyanate (commercially available as TMI® ex Cytec or isocyanatoethyl methacrylate). Alternatively Atom Transfer Radical Polymerisation (ATRP) of alkyl(meth)acrylates followed by reaction with acrylic acid as described in Example 2 in U.S. Pat. No. 6,936,656 B2.

Note that RAFT (reversible addition fragmentation transfer) polymerization utilizing chain transfer agents such as thiocarbonyl thio is less desirable for the preparation of $Y_1$ or $Y_2$ as the RAFT chain end remains active towards vinyl monomers during the copolymer synthesis.

Copolymer Synthesis

In one embodiment, the graft copolymer may be produced by polymerizing together monomers represented by Formulae (a), (b), (c), and (d)

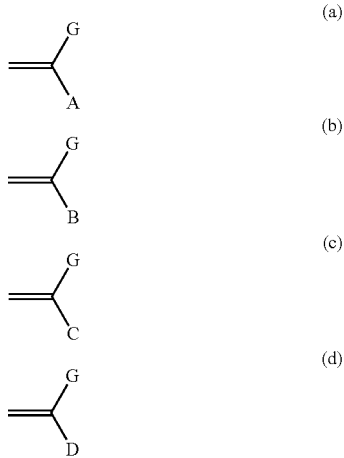

wherein G, A, B, C, and D are the same as defined above.

The copolymer may be produced by polymerising together ethylenically unsaturated monomers or by post polymerization functionalization of a polymer with the various specified functional groups and connecting groups. Polymerizing together ethylenically unsaturated monomers with the necessary functional groups and optional macromonomers is preferred. For the synthesis of a graft copolymer, free radical polymerisation is preferred, for the synthesis of a block copolymer living free radical polymerisation is preferred. Any controlled/living polymerisation may be used at this stage including Atom Transfer Radical Polymerisation (ATRP), Single-electron transfer living radical polymerization (SET-LRP), nitroxide mediated radical polymerisation (NMRP), radical addition fragmentation transfer (RAFT) polymerization, iodine transfer polymerization, selenium-centered radical mediated polymerization, telluride-mediated polymerization (TERP), stilbine mediated polymerization.

In one embodiment, the graft copolymer is polymerised by a free radical polymerisation in the presence of a chain transfer agent. Examples of a free radical chain transfer agent include catalytic cobalt chain transfer agents or mercaptans. Mercaptans are particularly useful. In another embodiment, the graft copolymer is polymerised by a free radical polymerisation in the presence of a RAFT agent (a reversible addition, fragmentation chain transfer agent.

Examples of mercaptans include 2-mercaptoethanol, 3-mercaptopropanol, thiopropyleneglycol, thioglycerine, thioglycolic acid, thiohydracrylic acid, thiolactic acid and thiomalic acid, isooctyl thioglycolate, n-butyl 3-mercaptopropionate, n-butyl thioglycolate, glycol dimercaptoacetate, trimethylolpropane trithioglycolate, or mixtures thereof. If the polymerisation is performed in solvent preferred examples of mercaptans include isooctyl thioglycolate, n-butyl 3-mercaptopropionate, n-butyl thioglycolate, glycol dimercaptoacetate, trimethylolpropane trithioglycolate, or mixtures thereof. In one embodiment, the mercaptan is butyl 3-mercaptopropionate.

Examples of a RAFT chain transfer agent include benzyl 1-(2-pyrrolidinone)carbodithioate, benzyl (1,2-benzenedicarboximido) carbodithioate, 2-cyanoprop-2-yl 1-pyrrolecarbodithioate, 2-cyanobut-2-yl 1-pyrrolecarbodithioate, benzyl 1-imidazolecarbodithioate, N,N-dimethyl-S-(2-cyanoprop-2-yl)dithiocarbamate, N,N-diethyl-S-benzyl dithiocarbamate, cyanomethyl 1-(2-pyrrolidone) carbodithioate, cumyl dithiobenzoate, 2-dodecylsulphanylthiocarbonylsulphanyl-2-methyl-propionic acid butyl ester, O-phenyl-S-benzyl xanthate, N,N-diethyl S-(2-ethoxy-carbonylprop-2-yl) dithiocarbamate, dithiobenzoic acid, 4-chlorodithiobenzoic acid, 0-ethyl-S-(1-phenylethyl)xanthate, O-ethyl-S-(2-(ethoxycarbonyl)prop-2-yl)xanthate, O-ethyl-S-(2-cyanoprop-2-yl)xanthate, O-ethyl-S-(2-cyanoprop-2-yl)xanthate, O-ethyl-S-cyanomethyl xanthate, O-pentafluorophenyl-S-benzyl xanthate, 3-benzylthio-5,5-dimethylcyclohex-2-ene-1-thione or benzyl 3,3-di(benzylthio)-prop-2-enedithioate, S, S'-bis-($\alpha$, $\alpha$'-disubstituted-$\alpha$"-acetic acid)-trithiocarbonate, S, S'-bis-($\alpha,\alpha$'-disubstituted-$\alpha$"-acetic acid)-trithiocarbonate or S-alkyl-S'-($\alpha,\alpha$'-disubstituted-$\alpha$"-acetic acid)-trithiocarbonates, benzyl dithiobenzoate, 1-phenylethyl dithiobenzoate, 2-phenyl-prop-2-yl dithiobenzoate, 1-acetoxyethyl dithiobenzoate, hexakis(thiobenzoylthiomethyl)benzene, 1,4-bis(thiobenzoylthiomethyl)benzene, 1,2,4,5-tetrakis(thiobenzoylthiomethyl)benzene, 1,4-bis-(2-(thiobenzoylthio)prop-2-yl)benzene, 1-(4-methoxyphenyl)ethyl dithiobenzoate, benzyl dithioacetate, ethoxycarbonylmethyl dithioacetate, 2-(ethoxycarbonyl)prop-2-yl dithiobenzoate, 2,4,4-trimethylpent-2-yl dithiobenzoate, 2-(4-chlorophenyl)prop-2-yl dithiobenzoate, 3-vinylbenzyl dithiobenzoate, 4-vinylbenzyl dithiobenzoate, S-benzyl diethoxyphos-phinyldithioformate, tert-butyl trithioperbenzoate, 2-phenylprop-2-yl 4-chlorodithiobenzoate, 2-phenylprop-2-yl 1-dithionaphthalate, 4-cyanopentanoic acid dithiobenzoate, dibenzyl tetrathioterephthalate, dibenzyl trithiocarbonate, carboxymethyl dithiobenzoate or poly(ethylene oxide) with dithiobenzoate end group, or mixtures thereof.

Polymerisation in the presence of RAFT chain transfer agents is described in more detail in the Handbook of Radical Polymerization, edited by Krzysztof Matyjaszewski and Thomas P. Davis, 2002, Chapter 12, pages 629 to 690, published by John Wiley and Sons Inc. (hereinafter referred to as "Matyjaszewski et al."). A discussion of the polymer mechanism of RAFT polymerisation is shown on page 664 to 665 in section 12.4.4 of Matyjaszewski et al.

If a solvent is used in the polymerisation process, suitable solvents include alcohols, such as methanol, ethanol, n-propanol, isopropanol, butanol, butoxyethanol; ketones, such as acetone, butanone, pentanone, hexanone and methyl ethyl ketone; alkyl esters of acetic, propionic and butyric acids, such as ethyl acetate, butyl acetate, amyl acetate, methoxy propyl acetate; ethers, such as tetrahydrofuran, diethyl ether, and ethylene glycol and polyethylene glycol monoalkyl and dialkyl ethers such as cellusolves and carbitols; and, glycols such as ethylene glycol and propylene glycol; and mixtures thereof. Esters and/or ketones and mixtures of esters and/or ketones with alcohols are particularly useful. In one embodiment, butyl acetate and methoxypropyl acetate and mixtures of butyl acetate or methoxypropyl acetate with alcohols are used as the solvent.

Polymerisation may be carried out at any suitable temperature for the solvent selected. Typically, polymerisation may be carried out in the presence of solvent at a temperature in the range of 50° C. to 150° C., or 60° C. to 120° C.

Any polymerisation initiator may be used. In one embodiment, the polymerisation initiator is any free radical polymerisation initiator; and the choice of initiator will be influenced by the polymerisation temperature and polymerisation process. The polymerisation initiators used in this process are known in the art and are selected from the conventional free radical initiators such as organic peroxides and azo compounds. The particular free radical initiator employed will depend upon the monomeric material(s) being polymerised and the process conditions. Typically, the amount of initiator may be in the range of 0.005 parts by weight to 5.00 parts by weight, based on 100 parts by weight of the monomer. However, 0.01 parts by weight to 2.00 parts by weight based on 100 parts by weight of monomer(s) is particularly useful.

Examples of suitable peroxide initiators include diacyl peroxides, dialkylperoxydicarbonates, t-alkyl peroxyesters, monoperoxycarbonates, diperoxyketals, diaklyperoxides, t-alkyl hydroperoxides, and ketone peroxide. Examples of diacyl peroxides are dibenzoyl peroxide, di(2,4-dichlorobenzoyl) peroxide, diacetyl peroxide, dilauroyl peroxide, didecanoyl peroxide, diisononanoyl peroxide, succinic acid peroxide. Examples of suitable azo initiators include 2,2'-azobis(4-methoxy-2,4-dimethylvaleronitrile), 2,2'-azobis(2,4-dimethyl-valeronitrile, 2,2'-azobisisobutyronitrile, dimethyl 2,2'-azobisisobutyrate, 2,2'-azobis(2-methylbutyronitrile), 1,1'-azobis(1-cyclohexanecarbonitrile), 2-(carbamoylazo)-isobutyronitrile, 2,2'-azobis(2,4,4-trimethyl-pentane).

The polymerisation temperature depends on the type of initiator used. In one embodiment, the initiator is selected so that polymerisation may be performed at a temperature of 50° C. and 100° C., or between 60° C. and 90° C. Typically, the initiators for use in the current invention include lauroyl peroxide, benzoyl peroxide, 1,1'-azobis(1-cyclohexanecarbonitrile), or 2,2'-azobisisobutyronitrile.

The moiety A of formula (1) can be derived from the polymerization of vinyl containing monomers as represented by formula (a) or can be represented by formula 2-9.

Formula (a) can be prepared by the reaction of an imide of formula (10) with vinyl monomers. An example is the reaction of aminoethoxyethanol with naphthalic anhydride to form an alcohol functional imide of formula (10) where X' is OH, b is 1, $R_2$ is —$(CH_2)_2$—O—$(CH_2)_2$— which can then be reacted with acrylic acid, to form the fused aromatic imide group represented by formula (2) after polymerization.

Formula (a) can be prepared by the reaction of an imide of formula (10) with vinyl monomers. An example is the reaction of aminoethoxyethanol with naphthalic anhydride to form an alcohol functional imide of formula (10) where X' is OH, b is 1, $R_2$ is —$(CH_2)_2$—O—$(CH_2)_2$— which can then be reacted with methacrylic acid or methacryloyl chloride, to form the fused aromatic imide group represented by formula (3) after polymerization.

Formula (a) can be prepared by the reaction of an imide of formula (10) with vinyl monomers. An example is the reaction of 6-aminohexanoic acid with naphthalic anhydride to form an acid functional imide of formula (10) where X' is OH, b is 1, $R_2$ is —$(CH_2)_5C(=O)$— which can then be reacted with hydroxyethyl methacrylate, to form the fused aromatic imide group represented by formula (4) after polymerization.

Formula (a) can be prepared by the reaction of an imide of formula (10) with vinyl monomers. An example is the reaction of aminoethoxyethanol with naphthalic anhydride to form an alcohol functional imide of formula (10) where X' is OH, b is 1, $R_2$ is —$(CH_2)_2$—O—$(CH_2)_2$— which can then be reacted with isocyanatoethyl methacrylate to form the fused aromatic imide group represented by formula (5) after polymerization.

Formula (a) can be prepared by the reaction of an imide of formula (10) with vinyl monomers. An example is the reaction of aminoethoxyethanol with naphthalic anhydride to form an alcohol functional imide of formula (10) where X' is OH, b is 1, $R_2$ is —$(CH_2)_2$—O—$(CH_2)_2$— which can then be reacted with isopropenyl-alpha,alpha-dimethylbenzyl isocyanate (TMI® ex Cytec), to form the fused aromatic imide group represented by formula (6) after polymerization.

Formula (a) can be prepared by the reaction of an imide of formula (10) with vinyl monomers. An example is the reaction of ethylene diamine with naphthalic anhydride to form an amine functional imide of formula (10) where X' is $NH_2$, b is 1, $R_2$ is —$(CH_2)_2$— which can then be reacted with glycidyl methacrylate, to form the fused aromatic imide group represented by formula (7) after polymerization.

Formula (a) can be prepared by the reaction of an imide of formula (10) with vinyl monomers. An example is the reaction of 6-aminohexanoic acid with naphthalic anhydride to form an acid functional imide of formula (10) where X' is OH, b is 1, $R_2$ is —$(CH_2)_5C(=O)$— which can then be reacted with glycidyl methacrylate, to form the fused aromatic imide group represented by formula (8) after polymerization.

Formula (a) can be prepared by the reaction of an imide of formula (10) with vinyl monomers. An example is the reaction of ethylene diamine with naphthalic anhydride to form an amine functional imide of formula (10) where X' is $NH_2$, b is 1, $R_2$ is —$(CH_2)_2$— which can then be reacted with acetoacetoxyethyl methacrylate, to form the fused aromatic imide group represented by formula (9) after polymerization.

The imide of formula (10) may be prepared in the melt or in a solvent, at temperatures between 100-200° C. The synthesis may involve a volatile solvent (bpt<100° C.) to improve mixing of reagents, and the solvent is then removed by distillation as the temperature is raised above the boiling point of the solvent.

The imide of Formula (10) is prepared in the solvent to avoid isolation of this intermediate. The maximum reaction temperature depends on the boiling point of the solvent used, examples of suitable solvents are toluene (bpt=110-111° C.), xylene (bpt=137-140° C.), propylene glycol monomethyl ether acetate (bpt=145-146° C.), dipropylene glycol methyl ether acetate (bpt=200° C.), diethylene glycol dibutyl ether (bpt=256° C.), tetraethylene glycol dimethyl ether (bpt=275-276° C.) or mixtures thereof.

The imide of Formula (10) is formed before reaction, if a mixture of amide and imide is present, the amide may convert to imide during the polymerisation process or after the polymerisation process by prolonged heating. A catalyst may be necessary to achieve high conversion of imide and some amide may still be present in the final product.

The process to prepare the polymer of Formula (10) of the present invention may be carried out in an inert atmosphere provided by any inert gas of the Periodic Table but typically nitrogen

INDUSTRIAL APPLICATION

The particulate solid present in the composition may be any inorganic or organic solid material which is substantially insoluble in the organic medium at the temperature concerned and which it is desired to stabilize in a finely divided form therein. The particulate solids may be in the form of a granular material, a fibre, a platelet or in the form of a powder, often a blown powder. In one embodiment, the particulate solid is a pigment.

The particulate solid (typically a pigment or filler) may have an average particle size measured by light scattering measurements of from 10 nanometers to 10 microns, or 10 nanometers to 1, 2, 3, or 5 microns, or 20 nanometers to 1, 2, 3, or 5 microns in diameter.

Examples of suitable solids are pigments for solvent inks; pigments, extenders, fillers, blowing agents and flame retardants for paints and plastic materials; dyes, especially disperse dyes; optical brightening agents and textile auxiliaries for solvent dyebaths; pigments for inks, toners and other solvent application systems; solids for oil-based and inverse-emulsion drilling muds; dirt and solid particles in dry cleaning fluids; metals; particulate ceramic materials and magnetic materials for ceramics, piezoceramic printing, refractories, abrasives, foundry, capacitors, fuel cells, ferro-fluids, conductive inks, magnetic recording media, water treatment and hydrocarbon soil remediation; organic and inorganic nanodisperse solids; metal, metal oxides and carbon for electrodes in batteries, fibres such as wood, paper, glass, steel, carbon and boron for composite materials; and biocides, agrochemicals and pharmaceuticals which are applied as dispersions in organic media.

In one embodiment, the solid is an organic pigment from any of the recognised classes of pigments described, for example, in the Third Edition of the Colour Index (1971) and subsequent revisions of, and supplements thereto, under the chapter headed "Pigments". Examples of organic pigments are those from the azo, disazo, trisazo, condensed azo, azo lakes, naphthol pigments, anthanthrone, anthrapyrimidine, anthraquinone, benzimidazolone, carbazole, diketo-pyrrolo-pyrrole, flavanthrone, indigoid pigments, indanthrone, isod-ibenzanthrone, isoindanthrone, isoindolinone, isoindoline, isoviolanthrone, metal complex pigments, oxazine, perylene, perinone, pyranthrone, pyrazoloquinazolone, quinacridone, quinophthalone, thioindigo, triarylcarbonium pigments, triphendioxazine, xanthene and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. In one embodiment, the organic pigments are phthalocyanines, especially copper phthalocyanines, monoazos, disazos, indanthrones, anthranthrones, quinacridones, diketopyrrolopyrroles, perylenes and carbon blacks.

Examples of inorganic pigments include metallic oxides such as titanium dioxide, rutile titanium dioxide and surface coated titanium dioxide, titanium oxides of different colours such as yellow and black, iron oxides of different colours such as yellow, red, brown and black, zinc oxide, zirconium oxides, aluminium oxide, oxymetallic compounds such as bismuth vanadate, cobalt aluminate, cobalt stannate, cobalt zincate, zinc chromate and mixed metal oxides of two or more of manganese, nickel, titanium, chromium, antimony, magnesium, cobalt, iron or aluminium, Prussian blue, vermillion, ultramarine, zinc phosphate, zinc sulphide, molybdates and chromates of calcium and zinc, metal effect pigments such as aluminium flake, copper, and copper/zinc alloy, pearlescent flake such as lead carbonate and bismuth oxychloride.

Inorganic solids include extenders and fillers such as ground and precipitated calcium carbonate, calcium sulphate, calcium oxide, calcium oxalate, calcium phosphate, calcium phosphonate, barium sulphate, barium carbonate, magnesium oxide, magnesium hydroxide, natural magnesium hydroxide or brucite, precipitated magnesium hydroxide, magnesium carbonate, dolomite, aluminium trihydroxide, aluminium hydroperoxide or boehmite, calcium and magnesium silicates, alumino-silicates including nanoclays, kaolin, montmorillonites including bentonites, hectorites and saponites, ball clays including natural, synthetic and expandable, mica, talc including muscovites, phlogopites, lepidolites and chlorites, chalk, synthetic and precipitated silica, fumed silica, metal fibres and powders, zinc, aluminium, glass fibres, refractory fibres, carbon black including single- and multi-walled carbon nanotubes, reinforcing and non-reinforcing carbon black, graphite, Buckminster-fullerenes, asphaltene, graphene, diamond, alumina, quartz, perlite, pegmatite, silica gel, wood flour, wood flake including soft and hard woods, saw dust, powdered paper/fibre, cellulosic fibres such as kenaf, hemp, sisal, flax, cotton, cotton linters, jute, ramie, rice husk or hulls, raffia, typha reed, coconut fibre, coir, oil palm fibre, kapok, banana leaf, caro, curaua, henequen leaf, harakeke leaf, abaca, sugar cane bagasse, straw, bamboo strips, wheat flour, MDF and the like, vermiculite, zeolites, hydrotalcites, fly ash from power plants, incinerated sewage sludge ash, pozzolanes, blast furnace slag, asbestos, chrysotile, anthophylite, crocidolite, wollastonite, attapulgite and the like, particulate ceramic materials such as alumina, zirconia, titania, ceria, silicon nitride, aluminium nitride, boron nitride, silicon carbide, boron carbide, mixed silicon-aluminium nitrides and metal titanates; particulate magnetic materials such as the magnetic oxides of transition metals, often iron and chromium, e.g., gamma-$Fe_2O_3$, $Fe_3O_4$, and cobalt-doped iron oxides, ferrites, e.g. barium ferrites; and metal particles, for instance metallic aluminium, iron, nickel, cobalt, copper, silver, gold, palladium, and platinum and alloys thereof.

Other useful solid materials include flame retardants such as pentabromodiphenyl ether, octabromodiphenyl ether, decabromodiphenyl ether, hexabromocyclododecane, ammonium polyphosphate, melamine, melamine cyanurate, antimony oxide and borates; biocides or industrial microbial agents such as those mentioned in tables 2, 3, 4, 5, 6, 7, 8 and 9 of the chapter entitled "Industrial Microbial Agents" in Kirk-Othmer's Encyclopedia of Chemical Technology, Volume 13, 1981, $3^{rd}$ Edition, and agrochemicals such as the fungicides flutriafen, carbendazim, chlorothalonil and mancozeb.

The organic medium present in the composition of the invention in one embodiment is a plastics material and in another embodiment an organic liquid. The organic liquid may be a non-polar or a polar organic liquid. By the term "polar" in relation to the organic liquid it is meant that an organic liquid is capable of forming moderate to strong bonds as described in the article entitled "A Three Dimensional Approach to Solubility" by Crowley et al in Journal of Paint Technology, Vol. 38, 1966, at page 269. Such organic liquids generally have a hydrogen bonding number of 5 or more as defined in the abovementioned article.

Examples of suitable polar organic liquids are amines, ethers, especially lower alkyl ethers, organic acids, esters, ketones, glycols, glycol ethers, glycol esters, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39-40 and these liquids all fall within the scope of the term polar organic liquid as used herein.

In one embodiment, polar organic liquids are dialkyl ketones, alkyl esters of alkane carboxylic acids and alkanols, especially such liquids containing up to, and including, a total of 6 carbon atoms. As examples of the polar organic liquids include dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxypropyl acetate and ethyl butyrate; glycols and glycol esters and ethers, such as ethylene glycol, 2-ethoxyethanol, 3 methoxypropylpropanol, 3-ethoxypropylpropanol, 2-butoxyethyl acetate, 3 methoxypropyl acetate, 3-ethoxypropyl acetate and 2-ethoxyethyl acetate; alkanols such as methanol, ethanol, n-propanol, isopropanol, n-butanol and isobutanol (also known as 2-methylpropanol), terpineol and dialkyl and cyclic ethers such as diethyl ether and tetrahydrofuran. In one embodiment, solvents are alkanols, alkane carboxylic acids and esters of alkane carboxylic acids. In one embodiment, the present invention is suitable for organic liquids that are substantially non-soluble in an aqueous medium. Furthermore a person skilled in the art will appreciate that small quantities of an aqueous medium (such as glycols, glycol ethers, glycol esters and alcohols) may be present in the organic liquids provided the overall organic liquid is substantially non-soluble in an aqueous medium.

Examples of organic liquids, which may be used as polar organic liquids are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, medium oil alkyd, short oil alkyd, polyether polyols and multi-media resins such as acrylic and urea/aldehyde.

The organic liquid may be a polyol, that is to say, an organic liquid with two or more hydroxy groups. In one embodiment, polyols include alpha-omega diols or alpha-omega diol ethoxylates.

In one embodiment, non-polar organic liquids are compounds containing aliphatic groups, aromatic groups or mixtures thereof. The non-polar organic liquids include non-halogenated aromatic hydrocarbons (e.g. toluene and xylene), halogenated aromatic hydrocarbons (e.g. chlorobenzene, dichlorobenzene, chlorotoluene), non-halogenated aliphatic hydrocarbons (e.g. linear and branched aliphatic hydrocarbons containing six or more carbon atoms both fully and partially saturated), halogenated aliphatic hydrocarbons (e.g. dichloromethane, carbon tetrachloride, chloroform, trichloroethane) and natural non-polar organics (e.g. vegetable oil, sunflower oil, rapeseed oil, linseed oil, terpenes and glycerides).

In one embodiment, the organic liquid comprises at least 0.1% by weight, or 1% by weight or more of a polar organic liquid based on the total organic liquid. The organic liquid optionally further comprises water. In one embodiment, the organic liquid is free of water.

The plastics material may be a thermosetting resin or a thermoplastic resin. The thermosetting resins useful in this invention include resins which undergo a chemical reaction when heated, catalyzed, or subject to ultra-violet, laser light, infra-red, cationic, electron beam, or microwave radiation and become relatively infusible. Typical reactions in thermosetting resins include oxidation of unsaturated double bonds, reactions involving epoxy/amine, epoxy/carbonyl, epoxy/hydroxyl, reaction of epoxy with a Lewis acid or Lewis base, polyisocyanate/hydroxy, amino resin/hydroxy moieties, free radical reactions or polyacrylate, cationic polymerization of epoxy resins and vinyl ether and condensation of silanol. Examples of unsaturated resins include polyester resins made by the reaction of one or more diacids or anhydrides with one or more diols. Such resins are commonly supplied as a mixture with a reactive monomer such as styrene or vinyltoluene and are often referred to as orthophthalic resins and isophthalic resins. Further examples include resins using dicyclopentadiene (DCPD) as a co-reactant in the polyester chain. Further examples also include the reaction products of bisphenol A diglycidyl ether with unsaturated carboxylic acids such as methacrylic acid, subsequently supplied as a solution in styrene, commonly referred to as vinyl ester resins.

In one embodiment, the thermosetting composite or thermosetting plastic may be a polyester, a polyvinyl acetate, a polyester resin in styrene, a polystyrene, or mixtures thereof.

Polymers with hydroxy functionality (frequently polyols) are widely used in thermosetting systems to crosslink with amino resins or polyisocyanates. The polyols include acrylic polyols, alkyd polyols, polyester polyols, polyether polyols and polyurethane polyols. Typical amino resins include melamine formaldehyde resins, benzoguanamine formaldehyde resins, urea formaldehyde resins and glycoluril formaldehyde resins. Polyisocyanates are resins with two or more isocyanate groups, including both monomeric aliphatic diisocyanates, monomeric aromatic diisocyanates and their polymers. Typical aliphatic diisocyanates include hexamethylene diisocyanate, isophorone diisocyanate and hydrogenated diphenylmethane diisocyanate. Typical aromatic isocyanates include toluene diisocyanates and diphenylmethane diisocyanates.

In one embodiment, thermoplastic resins include polyolefins, polyesters, polyamides, polycarbonates, polyurethanes, polystyrenics, poly(meth)acrylates, celluloses and cellulose derivatives. Said compositions may be prepared in a number of ways but melt mixing and dry solid blending are typical methods. Examples of a suitable thermoplastic include (low density, or linear low density or high density) polyethylene, polypropylene, polystyrene, polyethylene terephthalate (PET), polybutylene terephthalate (PBT), nylon 6, nylon 6/6, nylon 4/6, nylon 6/12, nylon 11 and nylon 12, polymethylmethacrylate, polyethersulphone, polysulphones, polycarbonate, polyvinyl chloride (PVC), thermoplastic polyurethane, ethylene vinyl acetate (EVA), Victrex PEEK™ polymers (such as oxy-1, 4-phenyleneoeoxy-1, 4-phenylenecarbonyl-1, 4-phenylene polymers) and acrylonitrile butadiene styrene polymers (ABS); and various other polymeric blends or alloys.

If desired, the compositions of the present invention may contain other ingredients, for example resins (where these do not already constitute the organic medium), binders, co-solvents, cross-linking agents, fluidising agents, wetting agents, anti-sedimentation agents, plasticisers, surfactants, dispersants other than the compound of the present invention, humectants, anti-foamers, anti-cratering agents, rheology modifiers, heat stabilizers, light stabilizers, UV absorbers, antioxidants, leveling agents, gloss modifiers, biocides and preservatives.

If desired, the compositions containing plastic material may contain other ingredients, for example dispersants other than the compound of the present invention, antifogging agents, nucleators, blowing agents, flame retardants, process aids, surfactants, plasticisers, heat stabilizers, UV absorbers, anti-oxidants, fragrances, mould release aids, anti-static agents, anti-microbial agents, biocides, coupling agents, lubricants (external and internal), impact modifiers, slip agents, air release agents and viscosity depressants.

The compositions typically contain from 1 to 95% by weight of the particulate solid, the precise quantity depending on the nature of the solid and the quantity depending on the nature of the solid and the relative densities of the solid and the polar organic liquid. For example, a composition in which the solid is an organic material, such as an organic pigment, in one embodiment contains from 15 to 60% by weight of the solid whereas a composition in which the solid is an inorganic material, such as an inorganic pigment, filler or extender, in one embodiment contains from 40 to 90% by weight of the solid based on the total weight of composition.

The compositions containing an organic liquid may be prepared by any of the conventional methods known for preparing dispersions. Thus, the solid, the organic medium and the dispersant may be mixed in any order, the mixture then being subjected to a mechanical treatment to reduce the particles of the solid to an appropriate size, for example by high speed mixing, ball milling, basket milling, bead milling, gravel milling, sand grinding, attritor grinding, two roll or three roll milling, plastic milling until the dispersion is formed. Alternatively, the solid may be treated to reduce its particle size independently or in admixture with either the organic medium or the dispersant, the other ingredient or ingredients then being added and the mixture being agitated to provide the composition. The composition can also be made by grinding or milling the dry solid with the dispersant and then adding the liquid medium or mixing the solid with the dispersant in a liquid medium in a pigment flushing process.

The composition containing the plastic material may be prepared by any of the conventional methods known for preparing thermoplastic compounds. Thus, the solid, the thermoplastic polymer, and the dispersant may be mixed in any order, the mixture then being subjected to a mechanical treatment to reduce the particles of the solid to an appropriate size, for example, by Banbury mixing, ribbon blending, twin-screw extrusion, twin-roll milling, compounding in a Buss co-kneader, or similar equipment.

The composition of the present invention is particularly suited to liquid dispersions. In one embodiment, such dispersion compositions comprise:
from 0.5 to 80 parts of a particulate solid;
b) from 0.1 to 79.6 parts of a polymer of formula (1); and
c) from 19.9 to 99.4 parts of an organic liquid and/or water;

wherein all relative parts are by weight and the amounts (a)+(b)+(c)=100.

In one embodiment, component a) comprises from 0.5 to 30 parts of a pigment and such dispersions are useful as (liquid) inks, paints and millbases.

If a composition is required comprising a particulate solid and a dispersant of Formula (1) in dry form, the organic liquid is typically volatile so that it may be readily removed from the particulate solid by a simple separation means such as evaporation. In one embodiment, the composition comprises the organic liquid.

If the dry composition consists essentially of the dispersant of formula (1) and the particulate solid, it typically contains at least 0.2%, at least 0.5% or at least 1.0% dispersant of formula (1) based on weight of the particulate solid. In one embodiment, the dry composition contains not greater than 100%, not greater than 50%, not greater than 20% or not greater than 10% by weight of dispersant of formula (1) based on the weight of the particulate solid.

As disclosed hereinbefore, the compositions of the invention are suitable for preparing millbases wherein the particulate solid is milled in an organic liquid in the presence of a compound for formula (1).

Thus, according to a still further aspect of the invention there is provided a millbase comprising a particulate solid, an organic liquid and a polymer of formula (1).

Typically, the millbase contains from 20 to 70% by weight particulate solid based on the total weight of the millbase. In one embodiment, the particulate solid is not less than 10 or not less than 20% by weight of the millbase. Such millbases may optionally contain a binder added either before or after milling.

In one embodiment, the binder is a polymeric material capable of binding the composition on volatilisation of the organic liquid.

Binders are polymeric materials including natural and synthetic materials. In one embodiment, binders include poly(meth)acrylates, polystyrenics, polyesters, polyurethanes, alkyds, polysaccharides such as cellulose, nitrocellulose, and natural proteins such as casein. The binder may be nitrocellulose. In one embodiment, the binder is present in the composition at more than 100% based on the amount of particulate solid, more than 200%, more than 300% or more than 400%.

The amount of optional binder in the millbase can vary over wide limits but is typically not less than 10%, and often not less than 20% by weight of the continuous/liquid phase of the millbase. In one embodiment, the amount of binder is not greater than 50% or not greater than 40% by weight of the continuous/liquid phase of the millbase.

The amount of dispersant in the millbase is dependent on the amount of particulate solid but is typically from 0.5 to 5% by weight of the millbase.

Dispersions and millbases made from the composition of the invention are particularly suitable for use in non-aqueous and solvent free formulations in which energy curable systems (ultra-violet, laser light, infra-red, cationic, electron beam, microwave) are employed with monomers, oligomers, etc. or a combination present in the formulation. They are particularly suitable for use in coatings such as paints, varnishes, inks, other coating materials and plastics. Suitable examples include their use in low, medium and high solids paints, general industrial paints including baking, two component and metal coating paints such as coil and can coatings, powder coatings, UV-curable coatings, wood varnishes; inks, such as flexographic, gravure, offset, lithographic, letterpress or relief, screen printing and printing inks for packaging printing, non-impact inks such as inkjet inks including continuous inkjet and drop on demand inkjet which include thermal, piezo and electrostatic, phase change inks and hot melt wax inks, inks for ink-jet printers and print varnishes such as overprint varnishes; polyol and plastisol dispersions; non-aqueous ceramic processes, especially tape-casting, gel-casting, doctor-blade, extrusion and injection moulding type processes, a further example would be in the preparation of dry ceramic powders for isostatic pressing; composites such as sheet moulding and bulk moulding compounds, resin transfer moulding, pultrusion, hand-lay-up and spray-lay-up processes, matched die moulding; construction materials like casting resins, cosmetics, personal care like nail coatings, sunscreens, adhesives, toners such as liquid toners, plastics materials and electronic materials such as coating formulations for colour filter systems in displays including organic light-emitting diode (OLED) devices, liquid crystal displays and electrophoretic displays, glass coatings including optical fibre coatings, reflective coatings or anti-reflective coatings, conductive and magnetic inks and coatings. They are useful in the surface modification of pigments and fillers to improve the dispersibility of dry powders used in the above applications. Further examples of coating materials are given in Bodo Muller, Ulrich Poth, Lackformulierung und Lackrezeptur, Lehrbuch fr Ausbildung und Praxis, Vincentz Verlag, Hanover (2003) and in P.G. Garrat, Strahlenhartung, Vincentz Verlag, Hanover (1996). Examples of printing ink formulations are given in E.W. Flick, Printing Ink and Overprint Varnish Formulations—Recent Developments, Noyes Publications, Park Ridge N.J., (1990) and subsequent editions In one embodiment, the composition of the invention further includes one or more additional known dispersants.

The invention herein is useful for making various particulate dispersions that go into inks, coatings and pigmented or filled polymer systems.

EXAMPLES

In the below example a graft copolymer was synthesised by copolymerization of a polyester macromonomer (intermediate A) with methyl methacrylate and a methacrylate functional fused aromatic (naphthenic) imide.

Intermediate A (Polyester Macromer)

Epsilon-caprolactone (558.49 parts by weight), 1-dodecanol (65.12 parts) and tin (II) chloride (0.005 parts) were stirred under nitrogen at 120° C. for 18 hours. The mixture was cooled to 70° C. and 3-isopropenyl-α,α-dimethyl benzene isocyanate (70.33 parts) and dibutyltindilaurate (1.0 parts) were added and stirred under nitrogen for 7 hours until no isocyanate remains (as determined by IR). The resulting products (a polymerisable poly(caprolactone) with a terminal dodecyl non-functional end group) was a waxy solid with Mn 2900 and Mw=3800 as determined by GPC (polystyrene standards)

Example 1

2(2-Aminoethoxyethanol) (3.68 parts by weight) was dissolved in propylene glycol monomethyl ether acetate (70 parts) and the mixture was stirred under nitrogen at 120° C. 1,8-Naphthalic anhydride (6.37 parts) was charged over 15 minutes and the mixture was stirred for a further two hours at 120° C. until no anhydride remains (as confirmed by IR analysis). This formed the imide reactant. The mixture was cooled to 90° C. then isocyanatoethyl methacrylate (5.44 parts) was added followed by dibutyltindilaurate (0.04 parts). This formed the imide reactant in a co-polymerisable form. The mixture was stirred for a further 30 minutes at 90° C. until no isocyanate remains (as confirmed by IR analysis). To this mixture was charged polyester macromonomer (70 parts, Intermediate A), methyl methacrylate (15 parts), propylene glycol monomethyl ether acetate (70 parts), butyl 3-mercaptopropionate (1 part) and 1,1'azobis(cyclohexanecarbonitrile) (1.0 parts). The mixture was stirred under nitrogen at 90° C. for 10 hours until no monomer remained (as determined by gravimetry). The resulting product was a clear yellow solution with a dispersant Mn=5000 and Mw=11300 as determined by GPC.

Dispersion Testing 1

Example 1(0.8 parts by weight) was dissolved in propylene glycol monomethyl ether acetate (7.2 parts). Glass beads (17 parts, 3 mm) and red pigment (2.0 parts) Cromophtal red A2B (ex Ciba) were added and the contents milled on a horizontal shaker for 16 hours. The resultant mill base was a fluid dispersion. A control experiment with identical components except with no dispersant resulted in a highly viscous gel.

Comparative Example 1

CE1

Butyl acrylate (100.14 parts), propylene glycol monomethyl ethyl acetate (100.97 parts) and butyl-2-methyl-2-[(dodecylsulfanylthiocarbonyl)sulfanyl] propionate (8.49 parts CTA-1 ex Lubrizol) were stirred under nitrogen at 75° C. Azobisisobutyronitrile (0.41 parts) and propylene glycol monomethyl ethyl acetate (10.14 parts) were added and the mixture heated at 75° C. for 40 minutes, then azobisisobutyronitrile (0.41 parts) and propylene glycol monomethyl ethyl acetate (10.14 parts) were added and the reaction mixture was heated at 75° C. for 120 minutes. Butyl acrylate (75.19 parts), propylene glycol monomethyl ethyl acetate (65.86 parts) and azobisisobutyronitrile (0.41 parts) were added to the reaction mixture over two hours. Dimethylaminoethyl methacrylate (75 parts), propylene glycol monomethyl ethyl acetate (75 parts) and azobisisobutyronitrile (0.82 parts) were then added to the reaction mixture over 2 hours. The reaction mixture was heated at 75° C. for a further 18 hours. The resulting yellow liquid was 49.53% solids and had Mn=15300 and Mw=22600 as determined by GPC (tetrahydrofuran eluent, polystyrene standards)

Intermediate B

A slurry of 1,8-naphthalic anhydride (10.21 parts) in water (73.23 parts) was charged to a solution of ethylene diamine (24.99 parts) in water (40.36 parts) over 10 minutes at room temperature. The mixture is heated at 70° C. for 10 minutes then was filtered while hot. The resulting yellow crystalline solid was discarded and the solution allowed to cool to room temperature. The resulting yellow precipitate was recovered by filtration and vacuum dried, this was Intermediate B. NMR analysis confirmed product formation.

Intermediate C

Butyl methacrylate (237 parts), propylene glycol monomethyl ethyl acetate (240 parts) and 2-mercaptoethanol (6.08 parts) were stirred under nitrogen at 90° C. 1,1'Azobis (cyclohexanecarbonitrile) (2.34 parts) and propylene glycol monomethyl ethyl acetate (12 parts) were added and the reaction mixture was heated at 90° C. for 8 hrs. A sample was removed for analysis (12.14 parts) and the resulting clear liquid had solids 50.28 wt. %. To the remaining product was added 3-isopropenyl-α,α-dimethylbenzyl isocyanate (15.3 parts TMI® ex Cytec) and dibutylbutyltindilaurate (0.49 parts. The reaction mixture was stirred under nitrogen at 90° C. for 8 hrs. until no isocyanate remained. The resulting clear liquid had solids of 48.61% with Mn=2100, Mw=5500 as determined by GPC (tetrahydrofuran eluent, polystyrene standards)

Intermediate D

1-Dodecanol (57.24 parts), ε-caprolactone (336.70 parts) and δ-valerolactone (104.57 parts) were stirred together under nitrogen at 100° C. Zirconium butoxide (1.68 parts) was added and the reactants were stirred under nitrogen for 18 hours at 175° C. After cooling to 20° C., a product was obtained as a waxy solid with Mn=1600 and Mw=2100 as determined by GPC (tetrahydrofuran eluent, polycaprolactone standards). The product was stirred under nitrogen at 70° C. 3-Isopropenyl-α,α-dimethylbenzyl isocyanate (63.7 parts, TMI® ex Cytec) and dibutyltin dilaurate (2.0 parts) were added. The reaction was then heated to 90° C. for 19 hours until no isocyanate remained as determined by IR. The product was obtained as a viscous liquid.

Intermediate E

1-Dodecanol (31.32 parts) and ε-caprolactone (268.67 parts) were stirred together under nitrogen. Tin (II) chloride (0.002 parts) was added and the reactants were heated to 120° C. for 18 hours. After cooling to 20° C., a product was obtained as a waxy solid with Mn=2800 and Mw=3800 as determined by GPC (tetrahydrofuran eluent, polycaprolactone standards). The product was stirred under nitrogen at 70° C., then 3-isopropenyl-α,α-dimethylbenzyl isocyanate (33.84 parts) and dibutyltin dilaurate (0.45 parts) were added. The reaction was then heated at 70° C. for 7 hours until no isocyanate remained as determined by IR. The resulting product was obtained as a waxy solid.

Intermediate F

2-Ethylhexyl methacrylate (50 parts), propylene glycol monomethyl ethyl acetate (43.75 parts), and cobalt catalyst (0.0025 parts, Co(II)(bis 4,4'-dimethylbenzildioxime diborondifluoride, U.S. Pat. No. 5,962,609, Formula V) were stirred under nitrogen at 90° C. 1,1'Azobis(cyclohexanecarbonitrile) (0.25 parts) in propylene glycol monomethyl ethyl acetate (5 parts) was added and the reaction mixture was heated at 90° C. for 18 hrs. The resulting clear liquid had solids 54.3 wt. % with Mn=1800 and Mw=3400 as determined by GPC polystyrene standards.

Copolymer A

Butyl acrylate (74.53 parts), propylene glycol monomethyl ethyl acetate (70.08 parts) and butyl-2-methyl-2-[(dodecylsulfanylthiocarbonyl)sulfanyl] propionate (5.83 parts CTA-1 ex Lubrizol) were stirred under nitrogen at 75° C. Azobisisobutyronitrile (0.25 parts) and propylene glycol monomethyl ethyl acetate (10.3 parts) were added and the mixture was heated at 75° C. for 40 minutes, then azobisisobutyronitrile (0.25 parts) and propylene glycol monomethyl ethyl acetate (3.0 parts) were added. The reaction mixture was heated at 75° C. for 120 minutes. Butyl acrylate (101.30 parts), propylene glycol monomethyl ethyl acetate (102.44 parts) and azobisisobutyronitrile (0.35 parts) were added to the reaction mixture over two hours. Glycidyl methacrylate (12.66 parts), methyl methacrylate (63.42 parts), propylene glycol monomethyl ethyl acetate (74.2 parts) and azobisisobutyronitrile (0.57 parts) were then charged to the reaction mixture over two hours. The contents were stirred under nitrogen for 18 hours. The resulting product was a yellow liquid with solids content 49.9 wt. %.

Copolymer B

Intermediate C (21 parts), butyl methacrylate (3 parts), glycidyl methacrylate (1.16 parts), propylene glycol monomethyl ethyl acetate (7.16 parts) and butyl-3-mercaptopropionate (0.298 parts) were stirred under nitrogen at 90° C. 1,1'Azobis(cyclohexanecarbonitrile) (0.298 parts) was added and the reaction mixture was stirred for 18 hours at 90° C. The resulting product was a yellow liquid with solids content 48.61 wt. %.

Copolymer C

Polypropylene glycol acrylate (29.18 parts, Mn 475), propylene glycol monomethyl ether acetate (27.68 parts) and butyl-2-methyl-2-[(dodecylsulfanylthiocarbonyl)sulfanyl] propionate (2.29 parts, CTA-1 ex Lubrizol) were stirred under nitrogen at 75° C. Azobisisobutyronitrile (0.1 parts) and propylene glycol monomethyl ether acetate (3.89 parts) were added and the reaction stirred for 60 minutes at 75° C. Azobisisobutyronitrile (0.1 parts) was added and the reaction mixture was stirred for 30 minutes at 75° C. Polypropylene glycol acrylate (38.91 parts, Mn 475), propylene glycol monomethyl ether acetate (38.91 parts) and azobisisobutyronitrile (0.13 part) were charged to reaction mixture over 90 minutes. Methyl methacrylate (24.32 parts), glycidyl methacrylate (4.86 parts), propylene glycol monomethyl ether acetate (29.40 parts) and azobisisobutyronitrile (0.22 parts) were added over 60 minutes. The reaction was then stirred under nitrogen for 18 hours. The resulting product was a yellow liquid with solids content 48.9 wt. %.

Copolymer D

Intermediate D (14 parts), butyl methacrylate (4 parts), glycidyl methacrylate (2 parts), propylene glycol monomethyl ether acetate (20.6 parts) and butyl-3-mercaptopropionate (0.3 parts) were stirred at 90° C. under nitrogen. 1,1'-Azobis(cyclohexanecarbonitrile) (0.3 parts) was added and the reaction mixture was stirred at 90° C. for 24 hours. The product was obtained as an amber liquid with solids content 52.4 wt. %.

Copolymer E

Intermediate E (14 parts), butyl methacrylate (4 parts), glycidyl methacrylate (2 parts), propylene glycol monomethyl ether acetate (20.6 parts) and butyl-3-mercaptopropionate (0.3 parts) were stirred at 90° C. under nitrogen. 1,1'-Azobis(cyclohexanecarbonitrile) (0.3 parts) was added and the reaction mixture was stirred at 90° C. for 20 hours. The product was obtained as an amber liquid with solids content 52.0%.

Copolymer F

Intermediate F (25.78 parts), butyl methacrylate (4 parts), glycidyl methacrylate (2 parts) and butyl acetate (8.22 parts) were stirred under nitrogen at 90° C. Azobis(cyclohexanecarbonitrile) (0.3 parts) was added and the reaction mixture was heated for 20 hrs at 90° C. The product was an amber liquid with solids content 56%.

Copolymer G

The composition of Copolymer G was based on Example 13 of U.S. Pat. No. 5,852,123

Intermediate F (45 parts), styrene (11.7 parts), methyl methacrylate (7.02 parts), 2-hydroxyethyl methacrylate, glycidyl methacrylate (2.34 parts) and butyl acetate (22.59 parts) were stirred under nitrogen at 90° C. 1,1'-Azobis (cyclohexanecarbonitrile) (0.68 parts) and butyl acetate (5 parts) were added and the reaction mixture was heated at 90° C. for 18 hours. The resulting product was a clear liquid with solids content 54.8 wt. %.

Example 2

COPOLYMER A (30.04 parts) was stirred under nitrogen at 70° C. Intermediate B (2.7 parts) was added and the mixture was heated at 70° C. for 18 hrs, 80° C. for 4 hrs, and 100° C. for 18 hrs. The resulting product was a yellow solution with solids content 58.4 wt. % with Mn=20500 and Mw=112500 as determined by GPC (tetrahydrofuran eluent, polystyrene standards)

Example 3

Intermediate B (0.92 parts) was added to COPOLYMER B (32.9 parts). The mixture was stirred at room temperature for 1 hour, then 50° C. for 1 hour, and then 70° C. for 18 hours. The resulting product was a yellow solution with solids content 49.33 wt. % with Mn=4100 and Mw=15200 as determined by GPC (tetrahydrofuran eluent, polystyrene standards)

Example 4

COPOLYMER C (40 parts) was stirred at 50° C. under nitrogen. Intermediate B (1.64 parts) and propylene glycol monomethyl ether acetate (1.64 g) were added and the reaction mixture was stirred and heated to 70° C. for 24 hours. The reaction was then heated to 80° C. for 6 hours. The resulting product was an amber liquid at 46.62% solids with Mn=3900 and Mw=105500 as determined by GPC (tetrahydrofuran eluent, polystyrene standards

Example 5

COPOLYMER D (41.2 parts) was stirred at 50° C. under nitrogen. Intermediate B (3.38 parts) was added and the reaction mixture was heated to 70° C. for 24 hours. The product was obtained as an amber liquid at 52.24 wt. % solids with Mn=4300 and Mw=16700 as determine by GPC (tetrahydrofuran eluent, polystyrene standards).

Example 6

COPOLYMER E (41.2 parts) was stirred at 50° C. under nitrogen. Intermediate B (3.41 parts) was added and the reaction mixture was heated to 70° C. for 24 hours. The product was obtained as an amber liquid at solids 62.4 wt. % with Mn=4900 and Mw=19600 as determine by GPC (tetrahydrofuran eluent, polystyrene standards).

Example 7

COPOLYMER F (40.35 parts) was stirred at 85° C. under nitrogen. Intermediate B (3.34 parts) was added and the reaction mixture was heated at 85° C. for 2 hours and then 100° C. for 18 hrs. The product was obtained as an amber liquid at 60 wt. % solids with Mn=2400 and Mw=5400 as determine by GPC (tetrahydrofuran eluent, polystyrene standards).

Comparative Example 2

CE2

This was based on Example 13 U.S. Pat. No. 5,852,123, except tetraethylammonium hydroxide replaced benzyl trimethylammonium hydroxide COPOLYMER G (50 parts) was stirred at 50° C. under nitrogen. Phthalimide (1.52 parts) and butyl acetate (1.52 parts) were added followed by tetraethylammonium hydroxide 0.1 M solution in isopropyl alcohol (0.31 parts). The contents were held at 100° C. for 16 hrs until the acid value was less than 2 mg KOH/g. The resulting product was obtained as hazy yellow liquid at solids 62.7 wt. % with Mn=4400 and Mw=13500.

Dispersion Testing 2

Examples 2-7 (1.0 parts based on a 50% solids) were dissolved in butyl acetate (7.0 parts). Glass beads (17 parts, 3 mm) and red pigment (2.0 parts) Cromophtal red A2B (ex Ciba) were added and the contents were milled on a horizontal shaker for 16 hours. The resultant mill base was a fluid dispersion with the exception of the Comparative Example 1, which gelled. The particle size (PS) of the mill base was evaluated by diluting the dispersions (0.1 parts) with propylene glycol monomethyl ether acetate (20 parts) and then were evaluated using a Nanotrac particle size analyser.

TABLE 3

| Example used in dispersion | Viscosity of mill base | PS (D50) nm | PS (D90) nm |
|---|---|---|---|
| CE1 | Gelled | 427 | 701 |
| Ex2 | Fluid | 211 | 339 |
| Ex3 | Fluid | 232 | 327 |
| Ex4 | Fluid | 356 | 548 |
| Ex5 | Fluid | 140 | 221 |
| Ex6 | Fluid | 149 | 207 |
| Ex7 | Fluid | 325 | 763 |

Dispersion Testing 3

Examples 5, 6, 7, CE1, and CE2 (1.0 parts based on a 50% solids) were dissolved in butyl acetate (7.0 parts). Glass beads (17 parts, 3 mm) and red pigment (2.0 parts) Cromophtal red A2B (ex Ciba) were added and the contents were milled on a horizontal shaker for 16 hours. The resultant mill bases (1.0 parts) were let down into acrylic binder (2.0 parts Macrynal® resin SMC565 ex Cytec). The dispersions were then coated onto black and white card with a No. 3 K-bar. The gloss and haze of the resulting coatings were evaluated using a Byk-Gardner Haze-gloss meter. Examples 5, 6 and 7 exhibited higher gloss and lower haze than Comparative Example 2. Comparative Example 1 was too thick to letdown.

TABLE 4

| Example | 20° Gloss of coating | 60° Gloss of coating | Haze of coating |
|---|---|---|---|
| CE1 | | Too thick | |
| CE2 | 60 | 86 | 222 |
| EX5 | 92 | 100 | 50 |
| EX6 | 87 | 99 | 98 |
| EX7 | 76 | 98 | 129 |

Each of the documents referred to above is incorporated herein by reference, including any prior applications, whether or not specifically listed above, from which priority is claimed. The mention of any document is not an admission that such document qualifies as prior art or constitutes the general knowledge of the skilled person in any jurisdiction. Except in the Examples, or where otherwise explicitly indicated, all numerical quantities in this description specifying amounts of materials, reaction conditions, molecular weights, number of carbon atoms, and the like, are to be understood as modified by the word "about." It is to be understood that the upper and lower amount, range, and ratio limits set forth herein may be independently combined. Similarly, the ranges and amounts for each element of the invention can be used together with ranges or amounts for any of the other elements.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the basic and novel characteristics of the composition or method under consideration.

While certain representative embodiments and details have been shown for the purpose of illustrating the subject invention, it will be apparent to those skilled in this art that various changes and modifications can be made therein without departing from the scope of the subject invention. In this regard, the scope of the invention is to be limited only by the following claims.

What is claimed is:

1. A polymeric dispersant comprising an olefinic backbone derived from polymerizing alpha-beta unsaturated olefinic monomers, wherein (i) at least 80 wt. % of the backbone repeat units are derived from polymerizing monomers which have the alpha-beta-olefin portion represented by (meth)acrylic acid, CH=C(G)-C(=O)—Z—, CH=C(G)

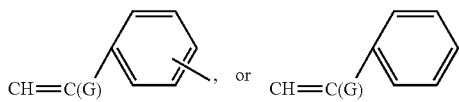

wherein G is selected from the group consisting of H and CH$_3$; and Z is a nitrogen or oxygen linking atom; ii) at least one of the monomers used to form the backbone is functionalized prior to or subsequent to polymerization with at least one imide group wherein the carbonyl groups of the imide are chemically bonded directly to carbon atoms of a fused aromatic ring; iii) wherein said dispersant has a number average molecular weight from about 1000 to about 100,000 g/mole; and iv) wherein said dispersant has at least one polymeric backbone block characterized as being an anchoring block that has chemically attached thereto said imide group and said polymeric backbone has also attached thereto at least one polymeric segment of 300 to 5000 g/mole molecular weight characterized as a solvent solubilizing polymeric segment;

wherein the dispersant has a structure according to formula 1 below formula 1

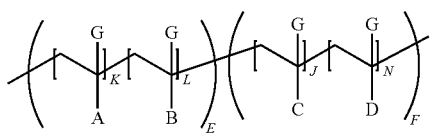

wherein each G independently is a CH$_3$ or H group or mixtures thereof

A is a moiety comprising a fused aromatic imide group,
B is a pendant moiety off a —CH$_2$—C(G)- derived from polymerizing ethylenically unsaturated monomers of which at least 80 mole percent are selected from the group consisting of (meth)acrylic acid, CH=C(G)-C(=O)—Z—,

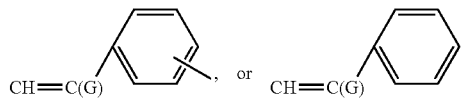

wherein G is selected from the group consisting of H and CH$_3$; and Z is a nitrogen or oxygen linking atom;
C is a pendant moiety off a —CH$_2$—C(G)- derived from polymerizing ethylenically unsaturated monomers of which at least 80 mole percent are selected from the group consisting of (meth)acrylic acid, CH=C(G)-C(=O)—Z—,

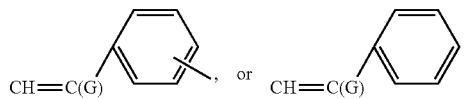

wherein G is selected from the group consisting of H and CH$_3$; and Z is a nitrogen or oxygen linking atom;
(meth)acrylic acid and CH=C(G)-C(=O)—Z—, are defined to be (meth)acrylic acids and esters of acrylic acid where the ester has an alkoxy group that has from 1 to 25 carbon atoms and optionally includes an epoxide group or hydroxyl group,
D is a moiety comprising polyether, polyester, polyacrylate, polyurethane, polyolefin and mixtures thereof having a number average molecular weight from about 300 to about 5000 g/mole and attached via a linking group to the polymer backbone or is derived from polymerizing a macromonomer comprising an ethylenically unsaturated group and a pendant polyether, polyester, polyacrylate, polyurethane, polyolefin and mixtures thereof having said 300 to 5000 g/mole molecular weight, K is from 1 to 50, L and J are each from about 0 to 499, and N is from 1 to 50, E is 1 or 2 and is the number of anchoring blocks, and F is 1 or 2 and is the number of solvent-solubilizing polymeric segments, with the proviso that if E is 1, F is 2 and if F is 1, E is 2.

2. The polymeric dispersant according to claim 1, wherein said dispersant has said at least one anchoring backbone portion and chemically bonded to backbone portion is said at least one polymeric segment characterized as a solvent solubilizing polymeric segment, further wherein the total weight of said solvent solubilizing polymeric segments are from about 40 to about 90 wt. % of the weight of said dispersant and the anchoring block has at least one functional imide group and is present from about 10 to about 60 wt. % of said dispersant.

3. The polymeric dispersant according to claim 1, wherein D comprises 300 to 5000 g/mole number average molecular weight poly(alkylene oxide) and N is from 1 to 50.

4. The polymeric dispersant according to claim 3, wherein D comprises a 500 to 3000 g/mole number average molecular weight poly(alkylene oxide), N is from 3 to 50, and said poly(alkylene oxide) comprises from 50 to 70 weight % of said dispersant.

5. The polymeric dispersant according to claim 1, wherein D comprises a 300-5000 g/mole number average molecular weight polyester solvent solubilizing chain and N is from 1 to 50.

6. The polymeric dispersant according to claim 5, wherein D comprises a 500 to 3000 g/mole number average molecular weight polyester derived from homo or co-polymerizing hydroxycarboxylic acids or lactones from said hydroxycarboxylic acid having 2 to 18 carbon atoms, N is from 3 to 50, and wherein 50 to 70 wt. % of said dispersant is said polyester.

7. The polymeric dispersant according to claim 1, wherein D comprises a 300 to 5000 g/mole number average molecular weight polyolefin or polyacrylate and wherein N is from 1 to 50.

8. The polymeric dispersant according to claim 7, wherein D comprises a 500 to 3000 g/mole number average molecular weight polyolefin or polyacrylate and wherein N is from 3 to 50.

9. The polymeric dispersant according to claim 1, having a number average molecular weight from about 2000 to about 60,000 g/mole.

10. The polymeric dispersant according to claim 1 wherein K is from 2 to about 25.

11. The polymeric dispersant according to claim 1, wherein the fused aromatic ring, of the imide having the carbonyl groups directly bonded to carbon atoms of a fused aromatic ring, comprises from 2 to 4 fused aromatic rings.

12. The polymeric dispersant according to claim 11, wherein the fused aromatic ring comprises a naphthalene fused aromatic ring.

13. A composition comprising a particulate solid, water, a polar or a non-polar organic medium, and a polymeric dispersant having at least one imide pendant group where the carbonyl groups of the imide are directly bonded to carbon atoms of a fused aromatic ring, wherein the polymeric dispersant is represented by a polymeric dispersant of claim 1.

14. The composition of claim 13, wherein the composition is a millbase, paint or ink.

15. The composition of claim 13, wherein the particulate solid is a pigment or filler.

16. The composition of claim 13, further comprising a binder.

17. The composition of claim 13, wherein the polymeric dispersant is present in an amount ranging from 0.5 wt. % to 30 wt. % of the composition.

* * * * *